United States Patent
Yu et al.

(10) Patent No.: US 9,730,097 B2
(45) Date of Patent: Aug. 8, 2017

(54) METHOD OF EFFICIENT BLIND SCELL ACTIVATION

(71) Applicant: MEDIATEK, INC., Hsin-Chu (TW)

(72) Inventors: Chia-Hao Yu, Yilan County (TW); Yih-Shen Chen, Hsinchu (TW)

(73) Assignee: MEDIATEK INC., Hsin-chu (TW)

( * ) Notice: Subject to any disclaimer, the term of this patent is extended or adjusted under 35 U.S.C. 154(b) by 524 days.

(21) Appl. No.: 13/947,379

(22) Filed: Jul. 22, 2013

(65) Prior Publication Data

US 2014/0029514 A1 Jan. 30, 2014

Related U.S. Application Data

(60) Provisional application No. 61/675,598, filed on Jul. 25, 2012.

(51) Int. Cl.
*H04W 24/10* (2009.01)

(52) U.S. Cl.
CPC .................. *H04W 24/10* (2013.01)

(58) Field of Classification Search
None
See application file for complete search history.

(56) References Cited

U.S. PATENT DOCUMENTS

| | | | |
|---|---|---|---|
| 7,085,252 B1 * | 8/2006 | Kuroiwa | H04B 1/7075 370/335 |
| 7,085,569 B2 * | 8/2006 | Ohmori | H04W 48/18 370/335 |
| 7,142,526 B1 * | 11/2006 | Hokao | H04W 48/20 370/331 |
| 7,200,165 B2 * | 4/2007 | Ohnishi | H04B 1/71072 375/150 |

(Continued)

FOREIGN PATENT DOCUMENTS

| | | |
|---|---|---|
| CN | 1652480 A | 2/2004 |
| CN | 102378210 A | 8/2010 |

(Continued)

OTHER PUBLICATIONS

International Search Report and Written Opinion of International Search Authority for PCT/CN2013/080084 dated Oct. 31, 2013(13 pages).

(Continued)

*Primary Examiner* — Gregory Sefcheck
(74) *Attorney, Agent, or Firm* — Imperium Patent Works; Zheng Jin

(57) ABSTRACT

An effective SCELL activation procedure is proposed to reduce the SCELL activation time. For carrier aggregation, a secondary cell (SCELL) needs to be configured and then activated before a UE can perform normal operation. In a first embodiment, the UE performs measurements on a list of candidate SCELLs before SCELL configuration. In a second embodiment, the UE performs measurements on a configured SCELL with high priority after the SCELL is configured. In a third embodiment, the UE performs deactivated-state SCELL measurements with adaptive SCELL measurement interval based on a configured measurement cycle and a state machine. Small SCELL activation time allows energy saving and network scheduling gain.

12 Claims, 5 Drawing Sheets

(56) References Cited

U.S. PATENT DOCUMENTS

| | | | | |
|---|---|---|---|---|
| 7,917,140 | B2* | 3/2011 | Palenius | H04W 48/20 |
| | | | | 455/422.1 |
| 8,301,145 | B2* | 10/2012 | Deivasigamani | H04W 48/20 |
| | | | | 370/331 |
| 8,488,528 | B2* | 7/2013 | Nagata | H04J 11/0069 |
| | | | | 370/208 |
| 8,554,163 | B2* | 10/2013 | Deshpande | H04W 24/10 |
| | | | | 455/127.1 |
| 8,565,155 | B2* | 10/2013 | Nakamura | H04W 48/16 |
| | | | | 370/328 |
| 8,599,772 | B2* | 12/2013 | Drugge | H04B 1/7103 |
| | | | | 370/329 |
| 8,660,096 | B2* | 2/2014 | Matsuo | H04B 1/70735 |
| | | | | 370/208 |
| 8,743,787 | B2* | 6/2014 | Bostrom | H04L 5/0051 |
| | | | | 370/241 |
| 8,804,593 | B2* | 8/2014 | Etemad | H04W 72/1215 |
| | | | | 370/312 |
| 8,817,647 | B2* | 8/2014 | Liao | H04L 1/0026 |
| | | | | 370/252 |
| 8,996,004 | B2* | 3/2015 | Cheng | H04W 48/16 |
| | | | | 370/331 |
| 9,020,499 | B2* | 4/2015 | Deivasigamani | H04W 48/20 |
| | | | | 370/331 |
| 9,137,702 | B2* | 9/2015 | Gu | H04B 7/024 |
| 9,357,420 | B2* | 5/2016 | Ahn | H04L 5/0007 |
| 2005/0239459 | A1 | 10/2005 | Katoh | 455/432.1 |
| 2011/0188396 | A1 | 8/2011 | Jung et al. | 370/252 |
| 2012/0106511 | A1 | 5/2012 | Wu | 370/331 |
| 2012/0250578 | A1* | 10/2012 | Pani | H04W 48/12 |
| | | | | 370/254 |
| 2012/0252432 | A1* | 10/2012 | Henttonen | H04W 24/00 |
| | | | | 455/422.1 |
| 2012/0300720 | A1* | 11/2012 | Gou | H04L 5/001 |
| | | | | 370/329 |
| 2013/0010711 | A1* | 1/2013 | Larsson | H04W 56/0005 |
| | | | | 370/329 |
| 2013/0016696 | A1* | 1/2013 | Adjakple | H04W 76/025 |
| | | | | 370/331 |
| 2013/0083747 | A1* | 4/2013 | Narasimha | H04W 74/0841 |
| | | | | 370/329 |
| 2013/0194947 | A1* | 8/2013 | Ehsan | H04L 5/0098 |
| | | | | 370/252 |
| 2015/0189516 | A1* | 7/2015 | Seo | H04L 5/001 |
| | | | | 370/329 |
| 2015/0189574 | A1* | 7/2015 | Ng | H04W 24/08 |
| | | | | 370/252 |
| 2015/0223125 | A1* | 8/2015 | Lu | H04W 48/20 |
| | | | | 455/440 |

FOREIGN PATENT DOCUMENTS

| | | |
|---|---|---|
| CN | 102026208 A | 12/2010 |
| WO | WO2012016515 A1 | 8/2010 |

OTHER PUBLICATIONS

EPO, Search Report for the EP patent application 13823516.3 dated Feb. 2, 2016 (9 pages).

3GPP TSG-RAN WG4 Meeting #63 R4-122676, Huawei et al., The clarification for SCell activation/deactivation and configuration/deconfiguration requirements, Prague, Czech Republic dated May 21-25, 2012 (4 pages).

3GPP TSG RAN WG2 Meeting #73 R2-110714, RAN WG4, LS on Rel'10 Deactivated SCell measurements, Taipei, Taiwan dated Feb. 21-25, 2011 (2 pages).

3GPP TSG-RAN WG4 Meeting #63AH R4-63AH-0133, CATT, Further discussion on interruption for SCell state transition, Oulu, Finland dated Jun. 26-28, 2012 (5 pages).

3GPP TSG-RAN4 Meeting #62bis R4-121677, NTT DOCOMO, No interruptions on PCell at SCell activation/deactivation when measCycleSCell is smaller than 640 ms, Jeju, Korea dated Mar. 26-30, 2012 (3 pages).

* cited by examiner

METHOD OF EFFICIENT BLIND SCELL ACTIVATION

CROSS REFERENCE TO RELATED APPLICATIONS

This application claims priority under 35 U.S.C. §119 from U.S. Provisional Application No. 61/675,598, entitled "Method of Efficient Blind SCell Activation," filed on Jul. 25, 2012, the subject matter of which is incorporated herein by reference.

TECHNICAL FIELD

The disclosed embodiments relate generally to wireless network communications, and, more particularly, to efficient SCELL activation for carrier aggregation in mobile communication networks.

BACKGROUND

A Long-Term Evolution (LTE) system offers high peak data rates, low latency, improved system capacity, and low operating cost resulting from simple network architecture. An LTE system also provides seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (eNodeBs or eNBs) communicating with a plurality of mobile stations, referred as user equipments (UEs). Enhancements to LTE systems are considered so that they can meet or exceed International Mobile Telecommunications Advanced (IMT-Advanced) fourth generation (4G) standard.

One of the key enhancements is to support bandwidth up to 100 MHz and be backwards compatible with the existing wireless network system. Carrier aggregation (CA) is introduced to improve the system throughput. With carrier aggregation, the LTE-Advance system can support peak target data rates in excess of 1 Gbps in the downlink (DL) and 500 Mbps in the uplink (UL). Such technology is attractive because it allows operators to aggregate several smaller contiguous or non-continuous component carriers (CC) to provide a larger system bandwidth, and provides backward compatibility by allowing legacy users to access the system by using one of the CCs.

With CA, two or more CCs are aggregated to support wider transmission bandwidth up to 100 MHz. A UE with reception and/or transmission capabilities for CA can simultaneously receive and/or transmit on multiple CCs corresponding to multiple serving cells. When CA is configured, the UE has only one RRC connection with the network. At RRC connection establishment/reestablishment or handover, one serving cell provides the NAS mobility information. At RRC connection reestablishment or handover, one serving cell provides the security input. This cell is referred to as the primary serving cell (PCELL), and other cells are referred to as the secondary serving cells (SCELLs). Depending on UE capabilities, SCELLs can be configured to form together with the PCELL as a set of serving cells under CA.

In LTE systems, an eNB may dynamically allocate resources among UEs. Carrier aggregation allows the mobile network to use the bandwidth more efficiently. However, it also increases the complexity of resource management. A light-weighted component-carrier management scheme is thus desirable. One of the issues is how to efficiently activate or deactivate one or more component carriers on a UE. For carrier aggregation, an SCELL is first configured by the network before usage in order to provide necessary information to the UE. A configured SCELL starts in a deactivated state for energy saving. A deactivated SCELL is then activated by the network before the UE can perform defined normal operation.

SCELL activation time should be reasonably small for energy saving. For long activation time, the benefit of fast SCELL activation/deactivation based on dynamic data traffic is lost. The time required for SCELL activation depends on the readiness of SCELL. If the configured SCELL has been measured by UE or UE has valid prior knowledge on synchronization and AGC of the SCELL, activation time can be smaller. On the other hand, if UE does not have any valid prior knowledge on the configured SCELL, activation time will be significantly longer.

A worst-case scenario is that SCELL activation command is received in the earliest possible timing after the SCELL is blindly configured to a UE. In such scenario, there is no valid prior knowledge of the configured SCELL. Such SCELL activation command before valid information of configured SCELL is referred to as blind SCELL activation. Another scenario that requires long SCELL activation time is that part of the prior knowledge is no longer valid so that long SCELL activation procedure is needed to reacquire the knowledge. This happens when deactivated SCELL measurement has been performing regularly. But due to, e.g., high mobility of UE and long measurement cycle, some of the knowledge of the SCELL (e.g., time/frequency synchronization information) cannot be regained through fast tracking techniques based on the prior knowledge. In such case, longer time is required to regain the knowledge. In the example of timing synchronization, longer time are required to use CRS for tracking. In worst scenario, PSS/SSS signals are required for timing acquisition. Mechanisms are required to keep the SCELL activation time small for energy saving and for scheduling gain.

SUMMARY

In LTE systems, an eNB may dynamically allocate resources among UEs. Carrier aggregation (CA) allows the mobile network to use the bandwidth more efficiently. For carrier aggregation, a secondary cell (SCELL) needs to be configured and then activated before a UE can perform normal operation. An effective SCELL activation procedure is proposed to reduce the SCELL activation time in the current invention. Small SCELL activation time allows energy saving and scheduling gain.

In a first embodiment, the UE performs inter-frequency measurements on a list of candidate SCELLs before SCELL configuration. The UE acquires AGC control and timing/frequency synchronization information during measurements. Because the UE performs inter-frequency measurements before the SCELL is configured, the UE has valid prior knowledge upon SCELL activation and readies the configured SCELL for normal operation before SCELL activation time constraints.

In a second embodiment, the UE performs measurements on a configured SCELL with high priority after the SCELL is configured. Because the measurements on the configured SCELLs are performed with high priority, UE is able to acquire AGC control, RF characteristics, and timing/frequency synchronization of the configured SCELL before SCELL activation command is received. As a result, UE readies the SCELL for normal operation before SCELL activation time constraint.

In a third embodiment, the UE performs deactivated-state SCELL measurements with adaptive SCELL measurement interval based on a configured measurement cycle and a state machine. During measurement, information on AGC control and timing/frequency synchronization information of the configured SCELL is acquired. The adaptation allows shortened measurement interval relative to configured measCycleSCell to track the acquired knowledge efficiently and enables quick SCELL activation.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
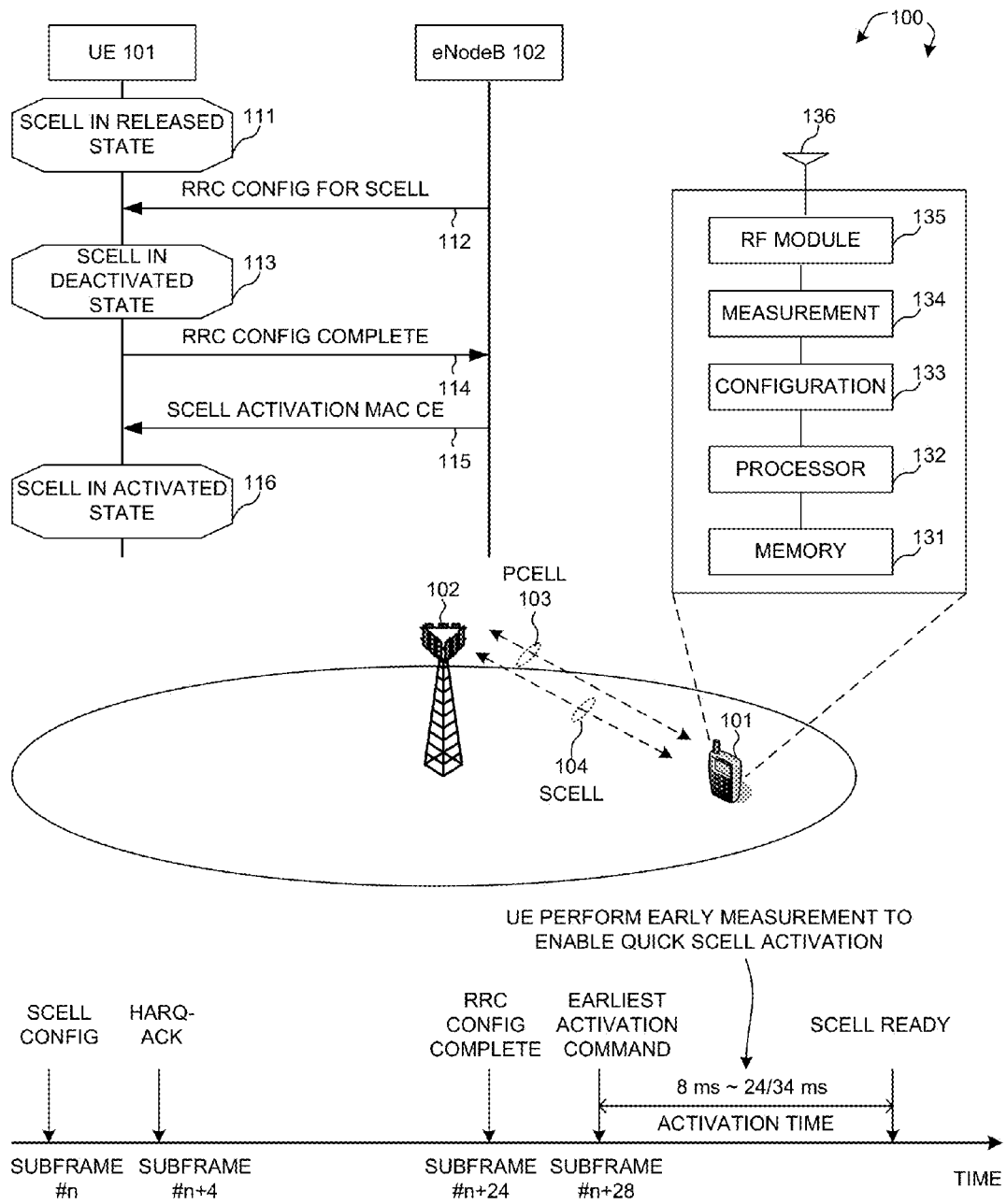
FIG. 1 illustrates a mobile communication network with efficient SCELL activation in accordance with one novel aspect.

FIG. 1 illustrates a mobile communication network 100 with efficient SCELL activation in accordance with one novel aspect. Mobile communication network 100 comprises a user equipment UE 101 and a base station eNodeB 102. Under carrier aggregation (CA), multiple component carriers (CCs) are aggregated to support wider transmission bandwidth up to 100 MHz. UE with reception and/or transmission capabilities for CA can simultaneously receive and/or transmit on multiple CCs corresponding to multiple serving cells. In the example of FIG. 1, SCELL 104 can be configured to form together with PCELL 103 as a set of serving cells. Carrier aggregation allows the mobile network to use the bandwidth more efficiently. In LTE systems, eNB 102 may dynamically allocate resources for UE 101, and dynamically activate/deactivate SCELL 104 by sending activation/deactivation commands.

Between UE 101 and eNB 102, a radio resource control (RRC) connection is first established over PCELL 103. The SCELLs needs to be configured and then activated. In step 111, SCELL 104 is in released state. In step 112, eNodeB 102 sends an RRC configuration message to configure SCELL 104. SCELL 104 is configured by the network before usage in order to provide necessary information such as SCELL frequency and physical cell ID (PCI) to UE 101. In step 113, the configured SCELL 104 starts in a deactivated state for energy saving. In step 114, UE 101 sends an RRC configuration complete message to eNodeB 101. In step 115, the deactivated SCELL 104 is activated by the network by sending an SCELL activation command via a media access control (MAC) control element (CE) to UE 101. In step 116, SCELL 104 is in activated state before UE 101 can perform defined normal operation.

SCELL activation time is defined as the time required for SCELL activation procedure after receiving the SCELL activation command. The SCELL activation procedure includes RF power on, frequency tuning, AGC adjustment, RF and frequency correction, and SCELL timing synchronization. As a FDD exemplifying timeline illustrated in FIG. 1, at subframe N, UE receives an SCELL configuration. At subframe N+4, UE sends an HARQ acknowledgment, and at subframe N+24, UE sends an RRC configuration complete message. At subframe N+28, UE receives the earliest SCELL activation command. UE then sends an acknowledgment on PCELL and starts the SCELL activation procedure. Depending on the readiness of the SCELL, the SCELL activation time varies from 8~24/34 ms based on current 3PP standard consensus. Upon SCELL activation, SCELL is activated and ready to monitor PDCCH for the SCELL, to measure/report CSI for the SCELL, and to transmit Sounding Reference Signal (SRS) on the SCELL.

SCELL activation time should be reasonably small for energy saving. For long activation time, the benefit of fast SCELL activation/deactivation based on dynamic data traffic is lost. SCELL activation time depends on the readiness of the configured SCELL at the time of activation. If the configured SCELL has been measured by UE or UE has valid prior knowledge on synchronization and AGC of the SCELL, then SCELL activation time can be smaller. On the other hand, if UE does not have any valid prior knowledge on the configured SCELL, then SCELL activation time will be significantly longer. A worst-case scenario is that SCELL activation command is received in the earliest possible timing after the SCELL is blindly configured to a UE. In such scenario, there is no valid prior knowledge of the configured SCELL. Such SCELL activation command before valid information of configured SCELL is referred to as blind SCELL activation. Another scenario that requires long SCELL activation time is that part of the prior knowledge is no longer valid so that long SCELL activation procedure is needed to reacquire the knowledge. This happens when deactivated SCELL measurement has been performing regularly. But due to, e.g., high mobility of UE and long measurement cycle, some of the knowledge of the SCELL (e.g., time/frequency synchronization information) cannot be regained through fast tracking techniques based on the prior knowledge.

In one novel aspect, an effective SCELL activation procedure is proposed to reduce the SCELL activation time. In general, early measurement attempt before/after SCELL configuration is beneficial to reduce SCELL activation time. UE acquires prior knowledge on AGC control, RF characteristics, and timing/frequency synchronization information by performing early measurement. Three methods are proposed. In a first embodiment, the UE performs measurements on a list of candidate SCELLs before SCELL configuration. In a second embodiment, the UE performs measurements on a configured SCELL with high priority after the SCELL is configured. In a third embodiment, the UE performs deactivated-state SCELL measurements with adaptive SCELL measurement interval based on a configured measurement cycle and a state machine.

FIG. 1 also illustrates a simplified block diagram of UE 101 that carry out embodiments of the current invention. UE 101 has RF transceiver module 135, coupled with antenna 136 receives RF signals from antenna 136, converts them to baseband signals and sends them to processor 132. RF transceiver 135 also converts received baseband signals from processor 132, converts them to RF signals, and sends out to antenna 136. Processor 132 processes the received baseband signals and invokes different functional modules to perform features in the UE. Memory 131 stores program instructions and data to control the operations of the UE. FIG. 1 further illustrates several functional modules in the UE that carry out embodiments of the current invention. The functional modules may be implemented by hardware, firmware, software, or any combination thereof. For example, configuration module 133 manages the configuration and activation of multiple CCs of the UE, while measurement module 134 performs various measurements of received radio signals over the multiple CCs.

Figure 2:
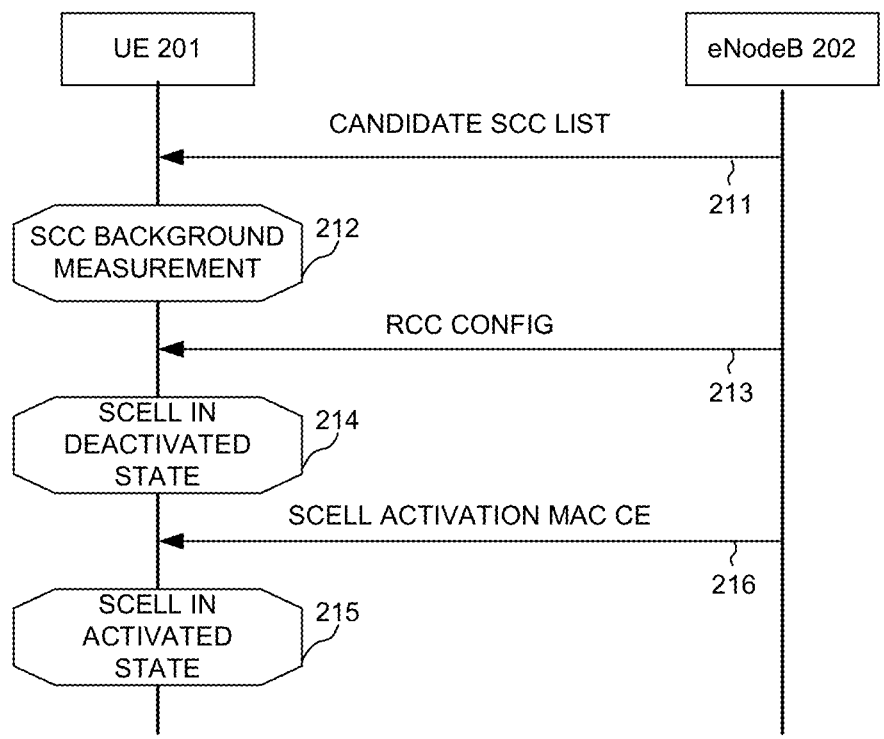
FIG. 2 illustrates a first example of a first embodiment of efficient SCELL activation.

FIG. 2 illustrates a first example of a first embodiment of efficient SCELL activation in a multi-carrier mobile communication system. UE 201 first establishes an RRC connection with eNB 202 over a primary component carrier PCC. In addition to the PCC, UE 201 supports multiple secondary component carriers (SCCs). In step 211, eNB 202 sends a list of candidate SCCs before performing any SCC configuration. For example, the candidate SCCs are determined by the network based on frequency priority or some other consideration. In step 212, UE 201 starts to perform inter-frequency measurements over the candidate SCCs. UE 201 acquires certain measurement side information of the candidate SCCs upon performing the measurements. The measurement side information includes synchronization and AGC information of the candidate SCCs, and can be used as prior information in case some of the SCCs are configured. In step 213, UE 201 receives an RRC configuration message for SCELL configuration. The RRC configuration message comprises SCELL configuration information including SCELL frequency, physical cell ID (PCI), etc. In step 214, the configured SCELL stays in deactivated state to save power. In step 215, UE 201 receives an SCELL activation command via a MAC CE from eNB 202. Upon receiving the SCELL activation command, in step 215, the configured SCELL is in activated state and ready for normal operation.

In the above-illustrated method, UE 201 performs inter-frequency measurements before the SCELL is configured. This way, UE 201 has valid prior knowledge upon SCELL activation and readies the SCELL for normal operation before SCELL activation time constraints. UE 201 takes extra efforts for inter-frequency measurements, where some or all of the inter-frequency carriers may not be configured as SCELLs. The network also takes extra efforts to signal the list of candidate SCCs. However, if the SCC candidates are properly determined, measurement overhead can be reduced.

Figure 3:
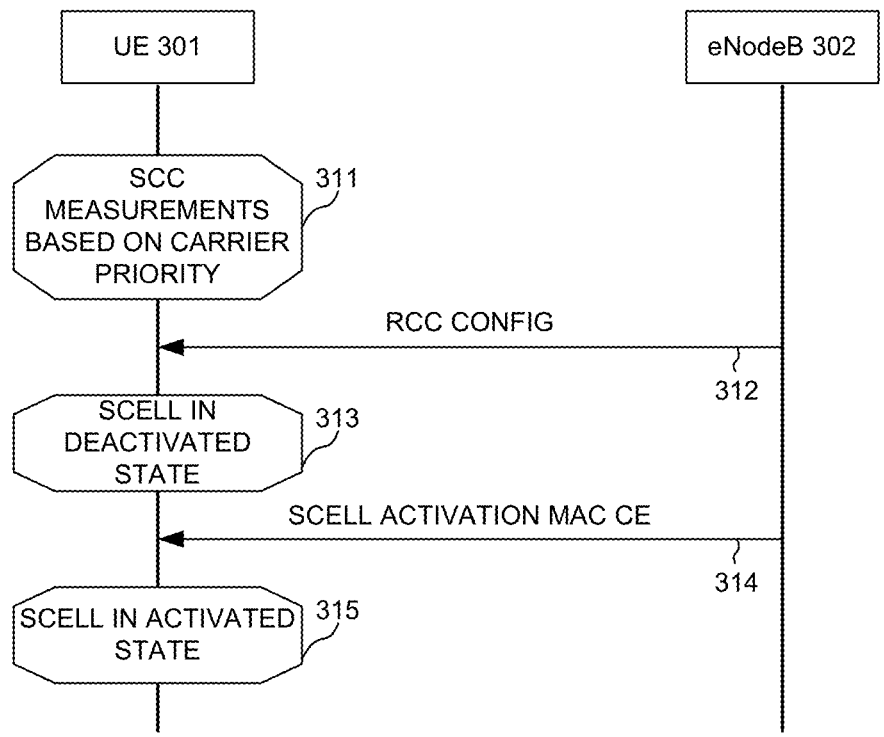
FIG. 3 illustrates a second example of a first embodiment of efficient SCELL activation.

FIG. 3 illustrates a second example of a first embodiment of efficient SCELL activation in a multi-carrier mobile communication system. UE 301 first establishes an RRC connection with eNB 302 over a primary component carrier PCC. In addition to the PCC, UE 301 supports multiple secondary component carriers (SCCs). In step 311, UE 301 starts to perform inter-frequency measurements over a list of candidate SCCs that are selected based on frequency priority. The frequency priority can be constructed by UE itself or signaled by the network from eNB 302. UE 301 acquires certain measurement side information of the candidate SCCs upon performing the measurements. The measurement side information includes synchronization and AGC of the candidate SCCs, and can be used as prior information in case some of the SCCs are configured. In step 312, UE 301 receives an RRC configuration message for SCELL configuration. The RRC configuration message comprises SCELL configuration information including SCELL frequency, physical cell ID (PCI), etc. In step 313, the configured SCELL stays in deactivated state to save power. In step 314, UE 301 receives an SCELL activation command via a MAC CE from eNB 302. Upon receiving the SCELL activation command, in step 314, the configured SCELL is in activated state and ready for normal operation.

In the above-illustrated method, UE 301 performs inter-frequency measurements before the SCELL is configured. This way, UE 301 has valid prior knowledge upon SCELL activation and readies the SCELL for normal operation before SCELL activation time constraints. UE 301 takes extra efforts for inter-frequency measurements, where some or all of the inter-frequency carriers may not be configured as SCELLs. However, since the measurements are based on frequency priority, it is likely that configured SCELLs will be measured before configuration for reducing measurement overhead. The frequency priority can be constructed by UE itself or signaled from eNB. For example, the frequency priority may be based on PLMN selection. If signaled by eNB, it can be related to the cell reselection priority received from dedicated signaling or through system information broadcasting. For small cell discovery, UE reports the proximity of an SCELL candidate cell to eNB, eNB then configures the SCELL.

Figure 4:
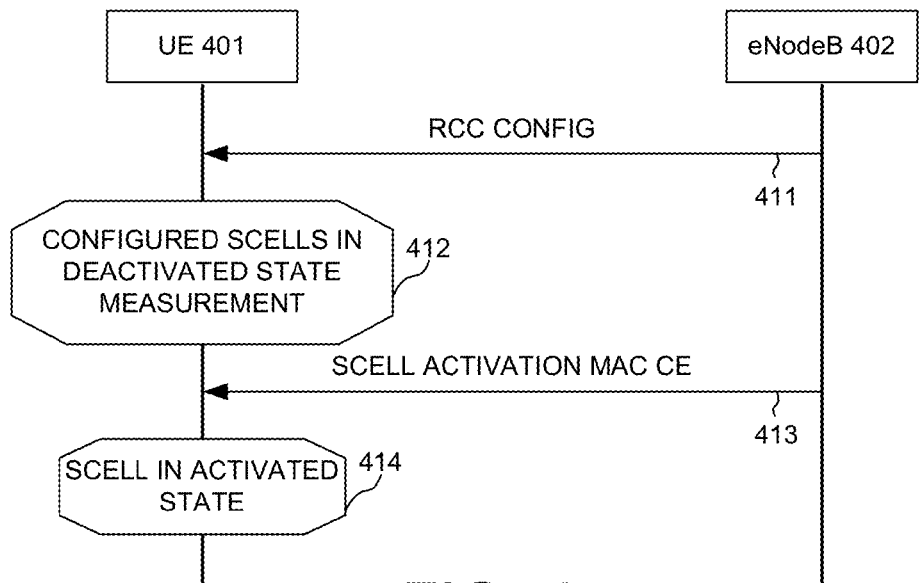
FIG. 4 illustrates a second embodiment of efficient SCELL activation.

FIG. 4 illustrates a second embodiment of efficient SCELL activation in a multi-carrier mobile communication system. UE 401 first establishes an RRC connection with eNB 402 over a primary component carrier PCC. In addition to the PCC, UE 401 supports multiple secondary component carriers (SCCs). In step 411, UE 401 receives an RRC configuration message for SCELL configuration. The RRC configuration message comprises SCELL configuration information including SCELL frequency, physical cell ID (PCI), etc. In step 412, the configured SCELL stays in deactivated state to save power. Meanwhile, UE 401 starts to perform measurements over the configured SCELL after SCELL configuration. In step 413, UE 401 receives an SCELL activation command via a MAC CE from eNB 402. Upon receiving the SCELL activation command, in step 414, the configured SCELL is in activated state and ready for normal operation.

In one advantageous aspect, the configured SCELL measurements are performed as a time-critical procedure. In general, a measurement procedure contains two steps: cell search first and then performing measurement based on the cell search results. In a first example, the time-critical procedure involves shortening cell search time. A general-purpose cell search procedure provides a list of cells that measurements should be performed on. The list of cells can include new cells (never measured before) and old cells. For SCELL measurements, the cell search procedure is guided to search for a PCI corresponding to the configured SCELL PCI provided in its corresponding RRC configuration message. Therefore, to speed up the whole procedure, a specific cell search procedure that targets at a given PCI can be applied. Furthermore, for reliability, a general-purpose cell search procedure actually consists of correlating synchronization signals (i.e., primary and/or secondary synchronization signals (PSS/SSS)) for several times and then accumulate its results. For prompt cell search output, the number of PSS/SSS correlation can be reduced to, e.g., one time if the received radio signals from SCELL is strong.

In a second example, the time-critical procedure involves shortening the measurement time. If a corresponding cell search procedure provides a list of detected cells to a measurement module for measurement, the measurement module can give the highest priority ranking to the configured SCELL first. For example, the configured SCELL measurements are performed with a higher priority as compared to all other neighbor cell measurements. Furthermore, the UE can perform the first SCELL measurement during DRX off time, and only then align SCELL measurements with DRX cycle. As a result, UE obtains SCELL measurement information promptly and readies the SCELL for normal operation before SCELL activation time constraint. To guarantee the first SCELL measurement before SCELL activation command is received, additional time-critical SCELL measurement is introduced with increased UE scheduling burden.

In another advantageous aspect, in step 412, UE performs SCELL measurements upon SCELL configuration with high priority only if there is no valid or at most partly valid measurement information on AGC and timing/frequency synchronization on the configured SCELLs. On the other hand, if UE already has valid prior knowledge on AGC and timing/frequency synchronization, then UE does not perform time-critical SCELL measurements. This way, UE does not introduce unnecessary time-critical SCELL measurements upon SCELL configuration.

Figure 5:
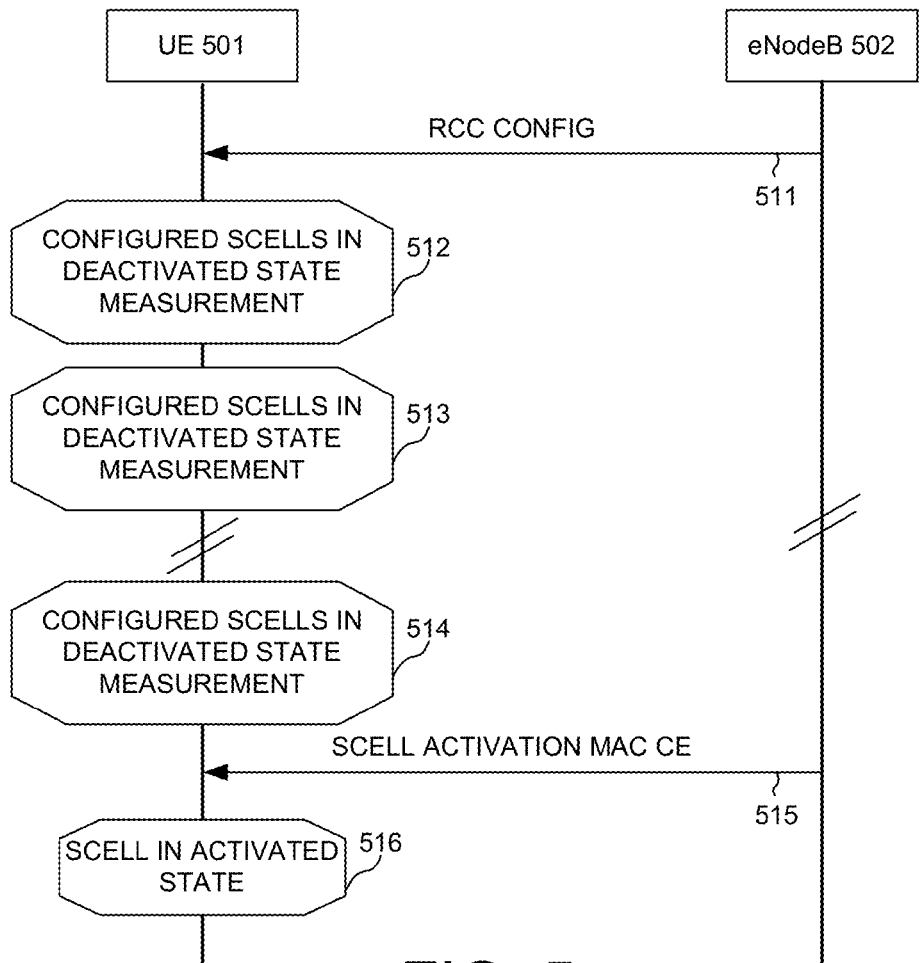
FIG. 5 illustrates a third embodiment of efficient SCELL activation.

FIG. 5 illustrates a third embodiment of efficient SCELL activation in a multi-carrier mobile communication system. UE 501 first establishes an RRC connection with eNB 502 over a primary component carrier PCC. In addition to the PCC, UE 501 supports multiple secondary component carriers (SCCs). In step 511, UE 501 receives an RRC configuration message for SCELL configuration. The RRC configuration message comprises SCELL configuration information including SCELL frequency, physical cell ID (PCI), etc. In step 512, UE 501 performs a first SCELL measurement on the configured SCELL after SCELL configuration. From step 513 to step 514, UE 501 performs the configured SCELL measurements regularly, with adaptive measurement interval based on measurement parameter and a state machine. In step 515, UE 501 receives an SCELL activation command via a MAC CE from eNB 502. Upon receiving the SCELL activation command, in step 516, the configured SCELL is in activated state and ready for normal operation under CA.

Figure 6:
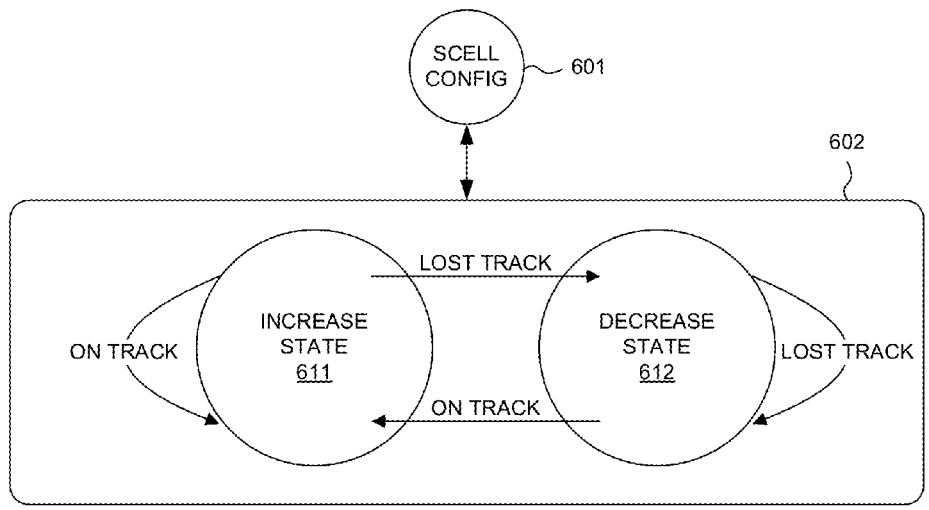
FIG. 6 illustrates a state machine used to facilitate efficient SCELL activation.

FIG. 6 illustrates one example of a state machine used to facilitate the above-illustrated efficient SCELL activation method. After SCELL configuration, the network may configure measurement parameters for UE. One of the measurement parameters includes a measurement interval for SCELL, i.e., measCycleSCell. A state machine maintains the tracking capability of the current measurement interval to the measurement information such as AGC, time/frequency synchronization. In one example, the state machine has two states: an increase state and a decrease state. In decrease state, the UE needs to reduce its measurement cycle because the tracking information is not up to date between measurements. In increase state, the tracking information is still workable between measurements so that the UE can increase its measurement cycle. Thus, based on the state machine, a shorter measurement interval than measCycleSCell may be selected when UE loses AGC and/or synchronization information. On the other hand, the longest measurement interval determined during the increase state may be subject to the configured measurement parameter measCycleSCell.

In the example of FIG. 6, a UE receives SCELL configuration in step 601 and starts deactivated-state SCELL measurements based on state machine 602. The UE initiates with default state assumed in increase state 611, and performs a measurement based on the configured measurement parameter i.e., measCycleSCell. In the next one or more measurements, if the tracking information error is small enough to be corrected during the measurement, then the machine stays/enters increase state 611 and increases the measurement interval. On the other hand, in the next one or more measurements, if the tracking information error is too large for the residual synchronization error to be corrected during the measurement, then the machine stays/enters decrease state 612 and the measurement interval is decreased. The amount for increasing or decreasing the length of measurement interval may be adjusted.

Therefore, based on state machine 602, the SCELL measurement interval is dynamically adapted based on the tracking ability of the current measurement interval. Note that for long measurement cycle or high UE mobility, UE may lose AGC and synchronization of the configured SCELLs before the next measurement instance. To facilitate quick SCELL activation, UE may choose to schedule more frequent measurements over SCELL than indicated by measCycleSCell. As a result, such adaptive measurement interval enables quick SCELL activation. In one example, the measurement interval equals to a multiple of discontinuous reception (DRX) cycle when DRX operation is configured.

Figure 7:
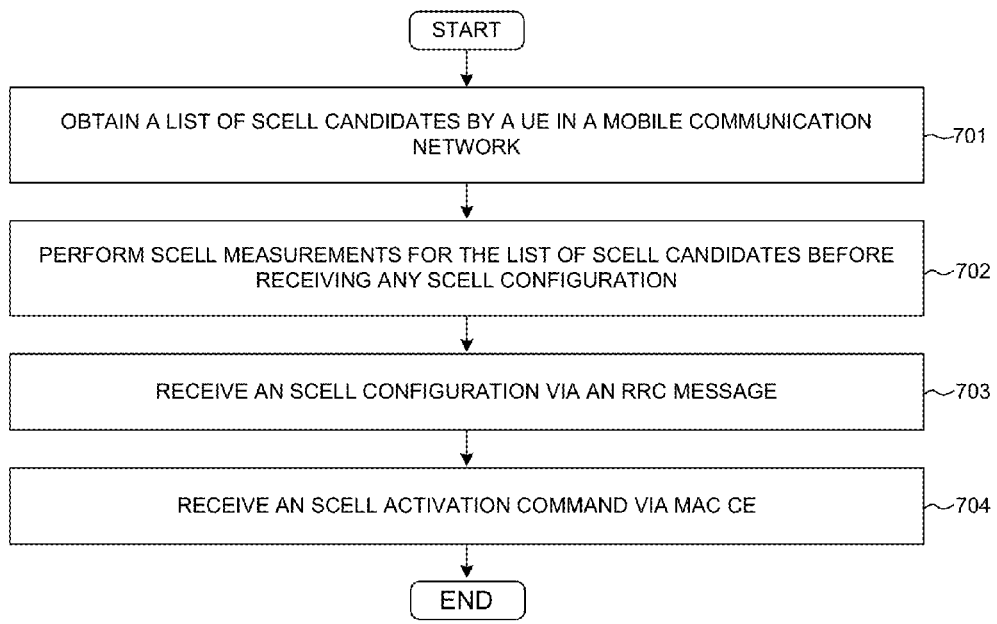
FIG. 7 is a flow chart of a first embodiment of a method of efficient SCELL activation in accordance with one novel aspect.

FIG. 7 is a flow chart of a first embodiment of a method of efficient SCELL activation in accordance with one novel aspect. In step 701, a UE obtains a list of SCELL candidates in a mobile communication network. The list of SCELL candidates may be determined by UE itself or signaled by the network. In one example, the list of SCELL candidates are based on frequency priority, e.g., related to PLMN selection or cell reselection priority. In step 702, the UE performs SCELL measurements for the list of SCELL candidates before receiving any SCELL configuration. The UE acquires AGC control and timing/frequency synchronization information during measurements. In step 703, the UE receives an RRC configuration message for SCELL configuration. Finally, in step 704, the UE receives an SCELL activation command via MAC CE. Because the UE performs inter-frequency measurements before the SCELL is configured, the UE has valid prior knowledge upon SCELL activation and readies the SCELL for normal operation before SCELL activation time constraints.

Figure 8:
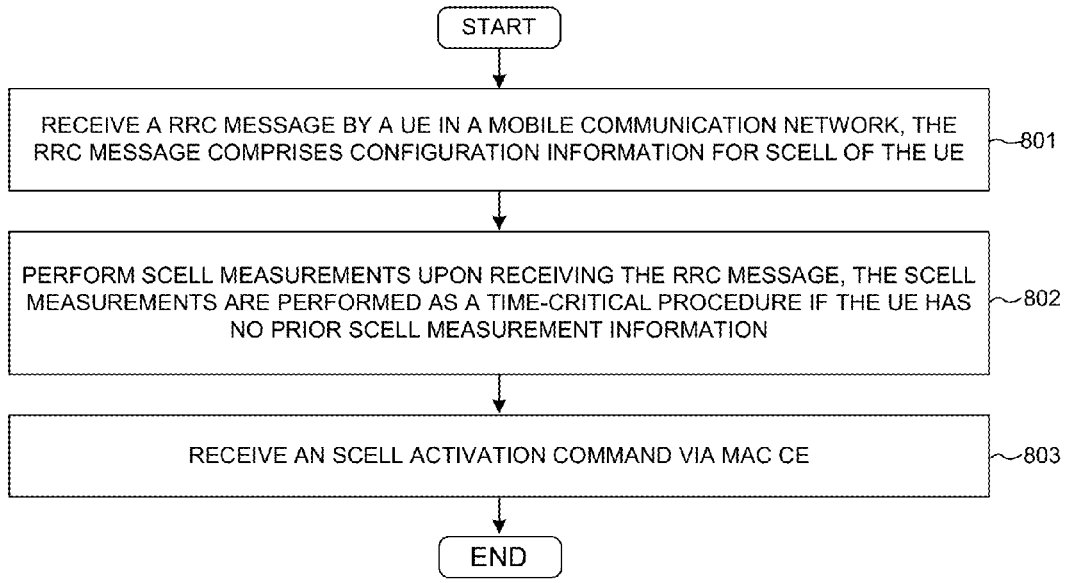
FIG. 8 is a flow chart of a second embodiment of a method of efficient SCELL activation in accordance with one novel aspect.

FIG. 8 is a flow chart of a second embodiment of a method of efficient SCELL activation in accordance with one novel aspect. In step 801, a UE receives an RRC configuration message for SCELL configuration in a mobile communication network. The RRC configuration message comprises SCELL configuration information such as SCELL frequency and PCI. In step 802, the UE performs SCELL measurements after receiving the SCELL configuration. The SCELL measurements are performed as a time-critical procedure if the UE has no prior SCELL measurement information, including AGC, time/frequency synchronization information. In step 803, the UE receives an SCELL activation command via MAC CE. Because measurements on configured SCELLs are performed with high priority, UE is able to acquired AGC control, RF characteristics, and timing/ frequency synchronization of the configured SCELL before SCELL activation command is received. As a result, UE readies the SCELL for normal operation before SCELL activation time constraint.

Figure 9:
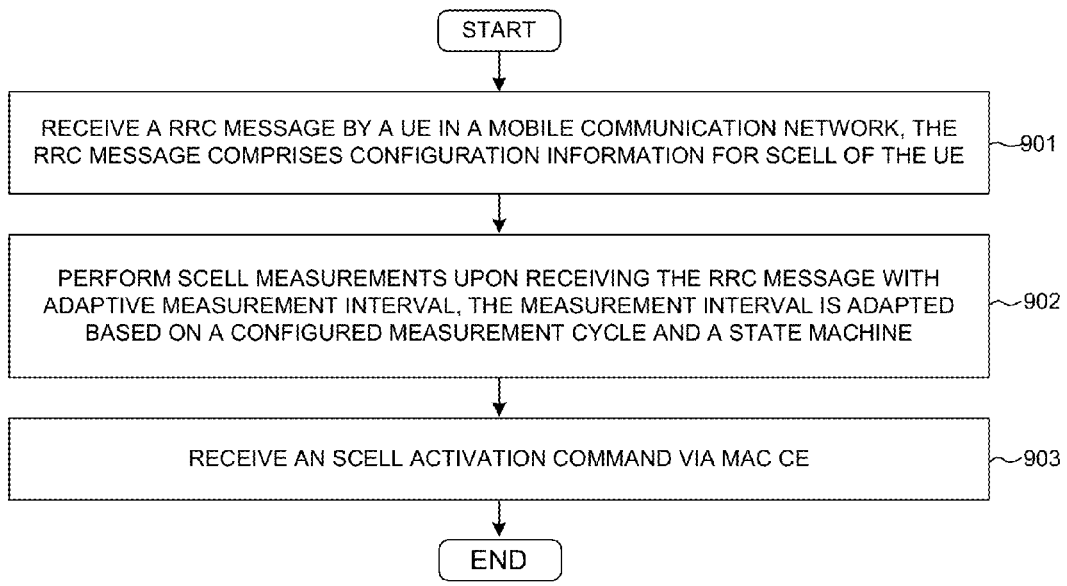
FIG. 9 is a flow chart of a third embodiment of a method of efficient SCELL activation in accordance with one novel aspect.

FIG. 9 is a flow chart of a third embodiment of a method of efficient SCELL activation in accordance with one novel aspect. In step 901, a UE receives an RRC configuration message for SCELL configuration in a mobile communication network. The RRC configuration message comprises SCELL configuration information such as SCELL frequency and PCI. In step 902, the UE performs deactivated-state SCELL measurements after receiving the SCELL configuration. The SCELL measurements are performed with adaptive measurement interval based on a configured measurement cycle and a state machine. During measurement, information on AGC control and timing/frequency synchronization information of the configured SCELL is acquired. The adaptation allows shortened measurement interval relative to configured measCycleSCell to track the acquired knowledge efficiently. In step 903, the UE receives an SCELL activation command via MAC CE. By applying the state machine, the adaptive measurement cycle enables quick SCELL activation.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
    receiving a radio resource control (RRC) message over an established primary cell (PCELL) by a user equipment (UE) in a wireless communication network, wherein the RRC message comprises configuration information for a secondary cell (SCELL) of the UE, wherein the RRC message is a dedicated signaling that further comprises guided cell search and measurement information;
    performing SCELL measurements upon receiving the RRC message for SCELL configuration, wherein the SCELL measurements are performed as a time-critical procedure having a specific cell search and measurement procedure based on the RRC message with the guided cell search and measurement information if the UE has no valid prior SCELL measurement result including SCELL synchronization information, wherein otherwise the SCELL measurements are performed as a general-purpose cell search and measurement procedure if the UE has valid prior SCELL measurement result; and
    receiving an SCELL activation command via a media access control (MAC) control element (CE), wherein the SCELL measurements under both the time-critical procedure and the general-purpose procedure satisfy a predefined SCELL activation time.

2. The method of claim 1, wherein the valid prior SCELL measurement result comprises SCELL automatic gain control (AGC) information, or SCELL timing and frequency synchronization information.

3. The method of claim 1, wherein the time-critical procedure involves shortening cell search time for SCELL measurements.

4. The method of claim 3, wherein the shortened cell search time is achieved via performing cell search to a reduced number of specified cells.

5. The method of claim 1, wherein the time-critical procedure involves shortening measurement time for high priority SCELL measurements.

6. The method of claim 5, wherein the shortened measurement time is achieved by giving higher priority ranking to the SCELL than other neighbor cells.

7. A user equipment (UE) comprising:
    a receiver that receives a radio resource control (RRC) message over an established primary cell (PCELL) in a wireless communication network, wherein the RRC message comprises configuration information for a secondary cell (SCELL) of the UE, wherein the RRC message is a dedicated signaling that further comprises guided cell search and measurement information;
    a measurement module that performs SCELL measurements upon receiving the RRC message for SCELL configuration, wherein the SCELL measurements are performed as a time-critical procedure having a specific cell search and measurement procedure based on the RRC message with the guided cell search and measurement information if the UE has no valid prior SCELL measurement result including SCELL synchronization information, wherein otherwise the SCELL measurements are performed as a general-purpose cell search and measurement procedure if the UE has valid prior SCELL measurement result; and
    a processor that activates the SCELL by receiving an SCELL activation command via a media access control (MAC) control element (CE) from the wireless communication network, wherein the SCELL measurements under both the time-critical procedure and the general-purpose procedure satisfy a predefined SCELL activation time.

8. The UE of claim 7, wherein the valid prior SCELL measurement result comprises SCELL automatic gain control (AGC) information, or SCELL timing and frequency synchronization information.

9. The UE of claim 7, wherein the time-critical procedure involves shortening cell search time for SCELL measurements.

10. The UE of claim 9, wherein the shortened cell search time is achieved via performing cell search to a reduced number of specified cells.

11. The UE of claim 7, wherein the time-critical procedure involves shortening measurement time for high priority SCELL measurements.

12. The UE of claim 11, wherein the shortened measurement time is achieved by giving higher priority ranking to the SCELL than other neighbor cell.

* * * * *